US012669286B2

(12) United States Patent
Kearney et al.

(10) Patent No.: US 12,669,286 B2
(45) Date of Patent: Jun. 30, 2026

(54) TAPERED PHASE CHANGE CRUCIBLE SYSTEM FOR THE SEPARATION OF RARE EARTH ELEMENTS

(71) Applicant: SHINE Technologies, LLC, Janesville, WI (US)

(72) Inventors: Kenny Kearney, Verona, WI (US); Matt Critchley, Brooklyn, WI (US)

(73) Assignee: SHINE Technologies, LLC, Janesville, WI (US)

( * ) Notice: Subject to any disclaimer, the term of this patent is extended or adjusted under 35 U.S.C. 154(b) by 389 days.

(21) Appl. No.: 18/202,496

(22) Filed: May 26, 2023

(65) Prior Publication Data

US 2024/0392411 A1 Nov. 28, 2024

(51) Int. Cl.
*F27B 14/10* (2006.01)
*F27B 14/08* (2006.01)

(52) U.S. Cl.
CPC .......... *F27B 14/10* (2013.01); *F27B 14/0806* (2013.01); *F27B 2014/0818* (2013.01)

(58) Field of Classification Search
CPC ... C22B 5/16; C22B 9/02; F27B 14/10; F27B 14/0805; F27B 14/08; F27B 2014/0818; B22D 18/06; B01D 7/00
See application file for complete search history.

(56) References Cited

U.S. PATENT DOCUMENTS

| | | | | |
|---|---|---|---|---|
| 790,435 A * | 5/1905 | Hunt | B22D 23/06 164/80 |
| 832,758 A | 10/1906 | Taylor | |
| 1,546,796 A * | 7/1925 | Saunders | B22D 27/11 164/319 |
| 2,629,897 A | 2/1953 | Mahla | |
| 4,787,439 A * | 11/1988 | Feagin | B22C 3/00 106/38.3 |
| 5,897,706 A | 4/1999 | Yamazaki et al. | |
| 2022/0404103 A1 | 12/2022 | Seddegh et al. | |
| 2023/0002855 A1 | 1/2023 | Piefer et al. | |
| 2025/0207218 A1* | 6/2025 | Childs | C22B 4/08 |

FOREIGN PATENT DOCUMENTS

| | | |
|---|---|---|
| CN | 2514005 Y | 10/2002 |
| CN | 102072649 A | 5/2011 |
| CN | 111206162 B | 2/2021 |
| RU | 2704005 C1 | 10/2019 |
| WO | WO 2021-202914 | 10/2021 |

OTHER PUBLICATIONS

DE 3237505 C2 machine translation and original document (Year: 1990).*
International Search Report & Written Opinion for PCT/US2024/030746, mailed Sep. 30, 2024, 14 pages.

* cited by examiner

*Primary Examiner* — Tima M. Mcguthry-Banks
(74) *Attorney, Agent, or Firm* — Casimir Jones, S.C.; Brian F. Bradley

(57) ABSTRACT

A collection crucible for use in a phase separation system, the collection crucible comprising: a body having a sidewall portion extending along a longitudinal axis. The body at least partially defines a cavity and an aperture extending to the cavity. The cavity is tapered along the longitudinal axis. The collection crucible further includes an ejector at least partially positioned in the aperture. The ejector is movable along the longitudinal axis between a first position and a second position to facilitate removal of collected material in the collection crucible.

20 Claims, 10 Drawing Sheets

TAPERED PHASE CHANGE CRUCIBLE SYSTEM FOR THE SEPARATION OF RARE EARTH ELEMENTS

TECHNOLOGY

The present disclosure is generally related to crucibles for phase change systems. More particularly, the present disclosure is directed to collection crucibles for the separation of rare earth elements and their purification, for example, by sublimation.

BACKGROUND

Lutetium-177 (Lu-177) is a radioisotope that is used in the treatment of neuro endocrine tumors, prostate, breast, renal, pancreatic, and other cancers. In the coming years, approximately 70,000 patients per year will need Lu-177 during their medical treatments.

Accordingly, a need exists for improved techniques of separating and purifying radioisotopes, such as Lu-177.

SUMMARY

According to a first aspect of the present disclosure, a crucible includes a body having a sidewall portion extending along a longitudinal axis, the body at least partially defines a cavity and an aperture extending to the cavity; wherein the cavity is tapered along the longitudinal axis; and an ejector at least partially positioned in the aperture; wherein the ejector is movable along the longitudinal axis between a first position and a second position.

A second aspect includes the crucible of the first aspect, wherein the body defines an open end and the cavity has a first diameter at the open end and a second diameter at a position spaced from the open end, the first diameter is larger than the second diameter.

A third aspect includes the crucible of the first aspect or the second aspect, wherein the sidewall portion includes an outer surface and an inner tapered surface.

A fourth aspect includes the crucible of any of the previous aspects, wherein the body further includes a floor surface contiguous with the inner tapered surface, wherein the inner tapered surface and the floor surface at least partially define the cavity.

A fifth aspect includes the crucible of any of the previous aspects, wherein the ejector includes a collection surface that at least partially defines the cavity when the ejector is in the first position.

A sixth aspect includes the crucible of any of the previous aspects, wherein the collection surface is aligned with the floor surface when the ejector is in the first position.

A seventh aspect includes the crucible of any of the previous aspects, wherein the ejector at least partially extends into the cavity when the ejector is in the second position.

An eight aspect includes the crucible of any of the previous aspects, wherein the ejector includes a collection surface that defines an entire floor portion of the cavity.

A ninth aspect includes the crucible of any of the previous aspects, wherein the aperture includes a recess portion and a bore portion, and wherein the ejector includes a head at least partially positioned in the recess portion when the ejector is in the first position, and wherein the ejector includes a shaft positioned in the bore portion.

A tenth aspect includes the crucible of any of the previous aspects, wherein the aperture further includes a vent portion extending radially from the bore portion.

An eleventh aspect includes the crucible of any of the previous aspects, wherein the shaft includes a shaft aperture extending to a shaft vent.

A twelfth aspect includes the crucible of any of the previous aspects, wherein the aperture and the ejector form a threaded connection, and wherein the ejector is moved between the first position and the second position in response to rotation of the ejector about the longitudinal axis.

A thirteenth aspect includes the crucible of any of the previous aspects, wherein the threaded connection is tapered along the longitudinal axis.

A fourteenth aspect includes the crucible of any of the previous aspects, further comprising a biasing member that biases the ejector towards the first position.

A fifteenth aspect includes the crucible of any of the previous aspects, wherein the crucible comprises a material that is chemically non-reactive with ytterbium.

According to a sixteenth aspect of the present disclosure, a crucible includes a body having a sidewall portion extending along a longitudinal axis, the body at least partially defines a cavity that is tapered along the longitudinal axis; and an ejector that is movable along the longitudinal axis between a first position and a second position; and wherein the body includes a deformable wall portion positioned between the cavity and the ejector, wherein the deformable wall portion is configured to deform into the cavity in response to the ejector moving from the first position to the second position.

A seventeenth aspect includes the crucible of the sixteenth aspect, wherein body includes an inner tapered surface and a floor surface that define the cavity.

An eighteenth aspect includes the crucible of the sixteenth aspect or the seventeenth aspect, wherein the sidewall portion includes an outer cylindrical surface and at least one outer planar surface.

A nineteenth aspect includes the crucible of any of the sixteenth through eighteenth aspects, wherein the ejector includes a screw and a pin, wherein the screw and the pin are received within a bore formed in the body with the pin positioned between the screw and the deformable wall portion.

According to a twentieth aspect of the present disclosure, a system includes a first crucible configured to hold a composition; a heater configured to heat the composition in the first crucible; a second crucible configured to collect a portion removed from the composition in response to heating the composition; wherein the second crucible includes a movable portion and wherein the portion removed from the composition is ejected from the second crucible in response to actuation of the movable portion.

According to a twenty-first aspect of the present disclosure, a method comprises heating a composition comprising a first element and a second element in a reaction crucible; collecting a portion of the second element removed from the composition in a collection crucible; and ejecting the collected portion of the second element from the collection crucible.

A twenty-second aspect includes the method of the twenty-first aspect, wherein the first element is a first rare earth element and the second element is a second rare earth element.

A twenty-third aspect includes the method of the twenty-first or twenty-second aspect, wherein the first rare earth element is lutetium and the second rare earth element is ytterbium.

A twenty-fourth aspect includes the method of any of the twenty-first through twenty-third aspects, wherein collecting the portion of the second element is on an inner tapered surface of the collection crucible.

A twenty-fifth aspect includes the method of any of the twenty-first through twenty-fourth aspects, wherein heating the composition phase separates the portion of the second element from the composition in the reaction crucible.

A twenty-sixth aspect includes the method of any of the twenty-first through twenty-fifth aspects, wherein heating the composition comprises inductively heating the composition.

A twenty-seventh aspect includes the method of any of the twenty-first through twenty-sixth aspects, wherein heating the composition comprises retaining a temperature of the composition in a temperature range of from 400° C. to 2000° C.

A twenty-eight aspect includes the method of any of the twenty-first through twenty-seventh aspects, wherein when heating the composition, the phase change crucible and the collection crucible are positioned in an inert or reduced pressure environment.

According to a twenty-ninth aspect of the present disclosure, a method includes heating a composition comprising a first element and a second element in a reaction crucible such that the composition phase separates a portion of the second element from the composition and the portion of the second element collects in a cavity of a collection crucible, forming a collected portion of the second element, wherein the cavity is defined by an inner tapered surface of the collection crucible and an adjustable collection region of the collection crucible; and ejecting the collected portion of the second element from the collection crucible by pressing the adjustable collection region of the collection crucible into the cavity.

A thirtieth aspect includes the method of the twenty-ninth aspect, wherein the collection crucible comprises a body having a sidewall portion extending along a longitudinal axis, the body comprising the inner tapered surface, and an aperture extending to the cavity; wherein the cavity is tapered along the longitudinal axis; an ejector at least partially positioned in the aperture; wherein the ejector comprises a collection surface that forms the adjustable collection region of the collection crucible; and pressing the adjustable collection region of the collection crucible into the cavity comprises moving the ejector from the first position to the second position, thereby moving the collection surface into the cavity of the collection crucible to eject the collected portion of the second element from the collection crucible.

A thirty-first aspect includes the method of the thirtieth aspect, wherein the collection crucible comprises a body having a sidewall portion extending along a longitudinal axis, the body comprising the inner tapered surface; wherein the cavity is tapered along the longitudinal axis; and an ejector that is movable along the longitudinal axis between a first position and a second position, wherein the body includes a deformable wall portion positioned between the cavity and the ejector; and the deformable wall portion forms the adjustable collection region and of the collection crucible; and pressing the adjustable collection region of the collection crucible into the cavity comprises moving the ejector from the first position to the second position, thereby deforming the deformable wall portion into the cavity of the collection crucible to eject the collected portion of the second element from the collection crucible.

A thirty-second aspect includes the method of any of the twenty-ninth through thirty-first aspects, wherein the first element is a first rare earth element and the second element is a second rare earth element; heating the composition comprises retaining a temperature of the composition in a temperature range of from 400° C. to 2000° C.; and when heating the composition, the phase change crucible and the collection crucible are positioned in an inert or reduced pressure environment.

A thirty-third aspect includes the crucible of the first aspect, wherein the ejector includes a collection surface that at least partially defines the cavity when the ejector is in the first position and at least partially extends into the cavity when the ejector is in the second position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
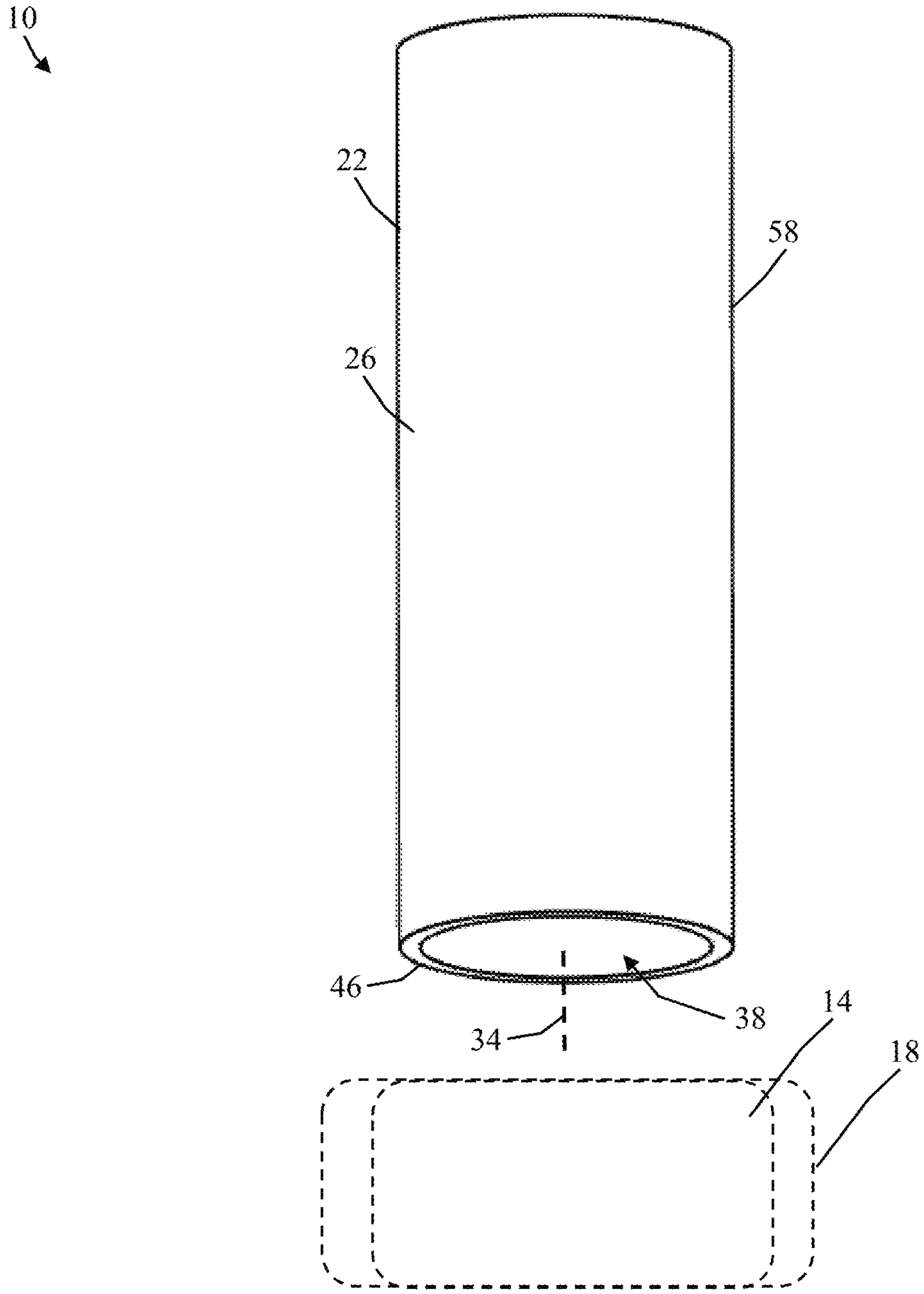
FIG. 1 schematically depicts a phase change system that includes a reaction crucible, a heater, and a collection crucible, according to one or more embodiments shown and described herein.

Referring generally to the figures, embodiments of the present disclosure are directed to a phase change system designed for the separation of rare earth elements, for example, the separation of ytterbium from a composition that comprises ytterbium and lutetium, by sublimation, distillation, or a combination thereof. A phase change crucible is configured to support separation of a second element (such as ytterbium) from a composition comprising a first element (such as lutetium) and the second element and collection of both the first element and the second element with minimal loss of either. For example, this separation may occur by sublimating or distilling the second element from the composition and collecting both the sublimated second element (e.g., in a collection crucible) and a remaining first element (e.g., in a reaction crucible). The remaining first element may compromise high purity isotopes of lutetium, such as lutetium-177 (Lu-177) separated from a composition comprising ytterbium and lutetium. The separated second element is collected in a collection crucible and allows the separated second element (e.g., ytterbium) to be reprocessed with minimal loss.

Lu-177 is used in the treatment of neuro endocrine tumors, prostate, breast, renal, pancreatic, and other cancers. In the coming years, approximately 70,000 patients per year will need no carrier added Lu-177 during their medical treatments. Lu-177 is useful for many medical applications, because during decay it emits a low energy beta particle that is suitable for treating tumors. It also emits two gamma rays that can be used for diagnostic testing. Isotopes with both treatment and diagnostic characteristics are termed “theranostic.” Not only is Lu-177 theranostic, but it also has a 6.65-day half-life, which allows for more complicated chemistries to be employed, as well as allowing for easy global distribution. Lu-177 also exhibits chemical properties that allow for binding to many bio molecules, for use in a wide variety of medical treatments.

There are two main production pathways to produce Lu-177. One is via a neutron capture reaction on Lu-176; Lu-176 (n,γ) Lu-177. This production method is referred to as carrier added (ca) Lu-177. A carrier is an isotope(s) of the same element (Lu-176 in this case), or similar element, in the same chemical form as the isotope of interest. In microchemistry the chemical element or isotope of interest does not chemically behave as expected due to extremely low concentrations. Moreover, isotopes of the same element cannot be chemically separated, and require mass separation techniques. The carrier method, therefore, results in the produced Lu-177 having limited medical application.

The second production method for Lu-177 is a neutron capture reaction on ytterbium-176 (Yb-176) (Yb-176 (n,γ) Yb-177) to produce Yb-177. Yb-177 then rapidly ($t_{1/2}$ of 1.911 hours) beta-decays into Lu-177. An impurity of Yb-174 is typically present in the Yb-176, leading to a further impurity of Lu-175 in the final product. This process is considered a “no carrier added” process. The process may be carried out as ytterbium metal or ytterbium oxide. The phase change system described herein which may be used for the separation of ytterbium and lutetium obtained from a no carrier added process. While the phase change system is primarily described herein in relation to the separation of ytterbium and lutetium, it should be understood that the phase change system may be used to facilitate separation of a variety of elements, for example any of the rare earth, and/or actinide metals where there is a difference in boiling/sublimation point, such as cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). The phase change systems disclosed in PCT Application No. PCT/US2021/025439, filed Apr. 1, 2021, and PCT Application No. PCT/US2020/061332, filed Nov. 19, 2020, are incorporated herein by reference in their entirety.

Referring now to FIG. 1, a phase change system 10 includes a phase change crucible 14, a heater 18, and a collection crucible 22. The phase change system 10 is configured to support separation of a second element from a composition comprising a first element and the second element. For example, the phase change crucible 14 may house and heat the composition, such that the second element separates from the composition by sublimation or distillation and collects in the collection crucible 22. In other words, the phase change crucible 14 is configured to hold a composition, and the collection crucible 22 is configured to collect a portion removed from the composition in response to heating the composition.

With continued reference to FIG. 1, the phase change system 10 may be used to separate elements, such as a first element (e.g., a first rare earth element) and a second element (e.g., a second rare earth element). During the separation process the phase change system 10 may be located in a chamber having gas, cooling, vacuum, power, and instrument feedthroughs. The separation process includes heating a composition comprising the first element and the second element in phase change crucible 14. Heating the composition comprises retaining a temperature of the composition in a temperature range of from 400° C. to 2000° C., for example, from 450° C. to 1500° C., from 450° C. to 1200° C., from 450° C. to 1000° C., from 400° C. to 1000° C., from 400° C. to 900° C., from 400° C. to 800° C., from 450° C. to 700° C., from 400° C. to less than 700° C., from 400° C. to 695° C., from 450° C. to 690° C., from 450° C. to 685° C., from 450° C. to 680° C., from 450° C. to 675° C., from 450° C. to 670° C., from 450° C. to 665° C., from 450° C. to 660° C., from 450° C. to 655° C., from 450° C. to 650° C., from 450° C. to 645° C., from 450° C. to 640° C., from 450° C. to 635° C., from 450° C. to 630° C., from 450° C. to 625° C., 470° C. to about 630° C., from 800° C. to 2000° C., from greater than 800° C. to 2000° C., from 1000° C. to 2000° C., from 1200° C. to 2000° C., from 1500° C. to 2000° C., or any range having any two of these values as endpoints. Indeed, the temperature for sublimation and/or distillation (e.g., the temperature in the environment) may be 400° C., 425° C., 450° C., 470° C., 475° C., 500° C., 525° C., 550° C., 575° C., 600° C., 625° C., 640° C., 650° C., 655° C., 660° C., 665° C., 670° C., 675° C., 680° C., 685° C., 690° C., 695° C., 698° C., 700° C., 725° C., 750° C., 775° C., 800° C., 850° C., 900° C., 950° C., 1000° C., 1100° C., 1200° C., 1300° C., 1400° C., 1500° C., 1600° C., 1700° C., 1800° C., 1900° C., 2000° C., any range having any two of these values as endpoints, or any value in a range having any two of these values as endpoints.

In some embodiments, heating the composition comprises inductively heating the composition with the heater 18. In other words, the heater 18 is configured to heat the composition in the phase change crucible 14. For example, the phase change crucible 14 may be an inductive heating crucible and heat may be inductively applied to the composition by inductively heating the phase change crucible 14 using the heater 18. In some embodiments, the heater 18 is an inductive heating source. In such embodiments, the material of the phase change crucible 14 is electrically and thermally conductive to facilitate inductive heating, such as a refractory metal material. It should be understood that embodiments are contemplated in which the heater 18 heats the composition using non-inductive heating techniques.

Moreover, in some embodiments, when heating the composition, the phase change system 10 may be positioned in an inert or reduced pressure environment. For example, the phase change system 10 may be positioned in chamber that forms an inert or reduced pressure environment. The inert or reduced pressure environment may be an environment with a pressure in a range of from 2000 torr to $1\times10^{-8}$, from 1520 torr to $1\times10^{-8}$ torr, from 1000 torr to $1\times10^{-8}$ torr, from 760 torr to $1\times10^{-8}$ torr, from 700 torr to $1\times10^{-8}$ torr, from 500 torr to $1\times10^{-8}$ torr, from 250 torr to $1\times10^{-7}$ torr, from 100 torr to $1\times10^{-6}$ torr, from 1 torr to $1\times10^{-6}$ torr, from $1\times10^{-1}$ torr to $1\times10^{-6}$ torr, $1\times10^{-3}$ or less, $1\times10^{-5}$ torr or less, $1\times10^{-6}$ torr or less, from 2000 torr to $1\times10^{-1}$ torr, from 1520 torr to 1 torr, from 1000 torr to 1 torr, from 760 torr to 1 torr, from 760 torr to 250 torr, any range having any two of these values as endpoints, or any value in a range having any two of these values as endpoints.

In some embodiments, the first element of the composition is a first rare earth element, such as lutetium, and the second element of the composition is a second rare earth element, such as ytterbium. Heating the composition phase separates the second element from the first element to leave a higher weight percentage of the first element in phase change crucible 14 than was present in the composition. For example, the phase separation may occur by distillation, sublimation, or a combination thereof. In sublimation, the solid phase of an element (e.g., the second element) is converted directly to the gas phase via heating, and the gas phase can then be collected for later use. In distillation, an element (e.g., the second element) is heated to its boiling point (going through the liquid phase) and vaporized off. The vaporized fraction can then be recovered downstream after the vapor is condensed. Indeed, in the embodiments described herein, the boiling point of the first element is higher than the boiling point of the second element and the sublimation point of the first element is higher than the sublimation point of the second element.

The separation process further comprises collecting the second element in the collection crucible 22. The collection crucible 22 is positioned above the phase change crucible 14 such that a gaseous form of the second element flows from the phase change crucible 14 to the collection crucible 22. As detailed herein, the second element may solidify and stick to the collection crucible by condensation. In some embodiments, the collection crucible 22 may be actively cooled, for example, by a cooling fluid, to promote solidification of the second element onto the collection crucible 22. As detailed further herein, the collection crucible 22 includes a movable portion (e.g., ejector 70, 114, 134, 150, 198) and the portion removed from the composition is ejected from the collection crucible 22 in response to actuation of the movable portion. Moreover, the collection crucible 22 includes an adjustable collection region (e.g., collection surface 74, 115, 135, 154; deformable wall portion 202) which may collect a portion of the second element and which may be pressed into a cavity of the collection crucible 22 (e.g., by the movable portion, such as the ejector 70) to eject the collected second element from the collection crucible 22. In the case in which lutetium is the first element and ytterbium is the second element, the ytterbium is vaporized and collected by the collection crucible 22 for later use leaving behind a material that is enriched in lutetium. The ytterbium that is collected is ejected from the collection crucible 22 and is available for recycling to a reactor, particle accelerator, or other neutron generating source, to produce further lutetium in subsequent runs of the process, for example, subsequent runs of the separation process performed using the phase change system 10.

Figure 2A:
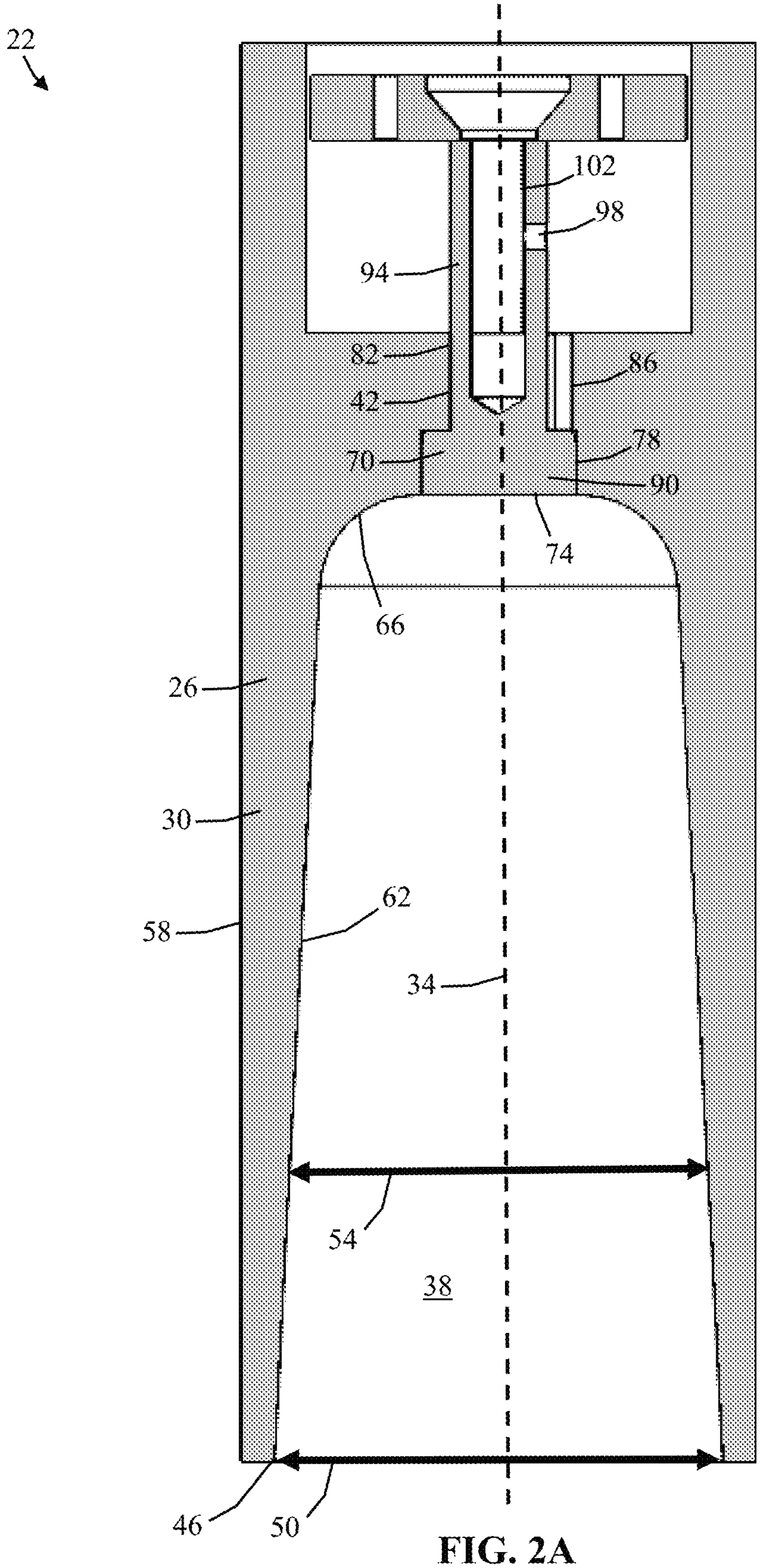
FIG. 2A is a cross-sectional view of the collection crucible of FIG. 1, illustrated with an ejector in a retracted position, according to one or more embodiments shown and described herein.

With reference to FIG. 2A, the collection crucible 22 includes a body 26 having a sidewall portion 30 extending along a longitudinal axis 34. The body 26 at least partially defines a cavity 38. The body 26 further includes an aperture 42 extending to the cavity 38. In some embodiments, the cross section of the cavity 38 varies along the longitudinal axis 34. In the illustrated embodiment, the cavity 38 is tapered along the longitudinal axis 34. The body 26 defines an open end 46 and the cavity 38 has a first diameter 50 at the open end 46, and a second diameter 54 at a position spaced from the open end 46. In the illustrated embodiment, the first diameter 50 is larger than the second diameter 54. Advantageously, the tapered shape of the cavity 38 facilitates easier removal of the collected material. In other words, the tapered shape allows collected rare earth elements to be more easily removed from the tapered collection crucible.

With continued reference to FIG. 2A, the sidewall portion 30 includes an outer surface 58, which may be a cylindrical surface, a rectangular surface, or the like, and an inner tapered surface 62. The body 26 further includes a floor surface 66 contiguous with the inner tapered surface 62. In other words, the floor surface 66 touches and shares a boarder with the inner tapered surface 62. The inner tapered surface 62 and the floor surface 66 at least partially define the cavity 38.

In some embodiments, at least a portion of the collection crucible 22 comprises a material that is chemically non-reactive with the element to be collected (e.g., the second element, which may comprise ytterbium) and is thermally conductive such that the collection crucible 22 may be actively cooled. Example materials for the collection crucible 22 include steel, boron nitride, titanium nitride, quartz, glass, and ceramic, however, it should be understood that any material that is chemically non-reactive with the second element may be used.

Figure 2B:
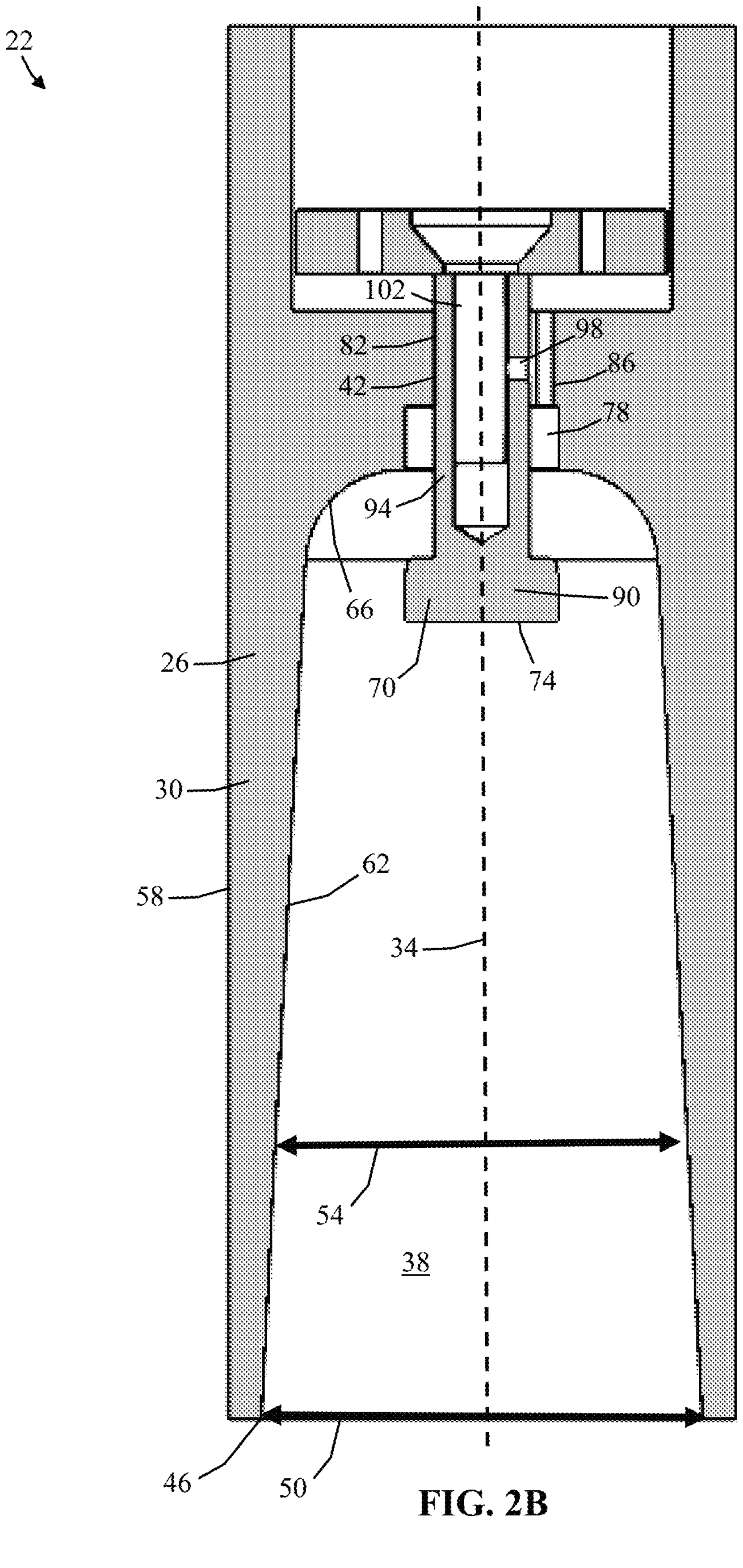
FIG. 2B is a cross-sectional view of the collection crucible of FIG. 1, illustrated with an ejector in an extended position, according to one or more embodiments shown and described herein.

With continued reference to FIG. 2A, the collection crucible 22 further includes an ejector 70 at least partially positioned in the aperture 42. As detailed further herein, the ejector 70 is movable to eject or release the material that has collected within the cavity 38 of the body 26 during the phase separation process. In other words, collected material in the collection crucible 22 is removed by the ejector 70. In the illustrated embodiment, the ejector 70 is movable along the longitudinal axis 34 between a first position (FIG. 2A, a retracted position) and a second position (FIG. 2B, an extended position). With continued reference to FIG. 2A, the ejector 70 includes a collection surface 74 that at least partially defines the cavity 38 when the ejector 70 is in the first position. In the illustrated embodiment, the collection surface 74 is aligned and flush with the floor surface 66 when the ejector 70 is in the first position.

With reference to FIG. 2B, the ejector 70 is shown in the second position (e.g., an extended position). In the second position, the ejector 70 at least partially extends into the cavity 38. In other words, the collection surface 74 is offset from the floor surface 66 along the longitudinal axis 34 when the ejector 70 is in the second position. As detailed herein, movement of the ejector between positions can be caused by a press, an actuator, a manual actuation, or any type of suitable actuation force.

Figure 3:
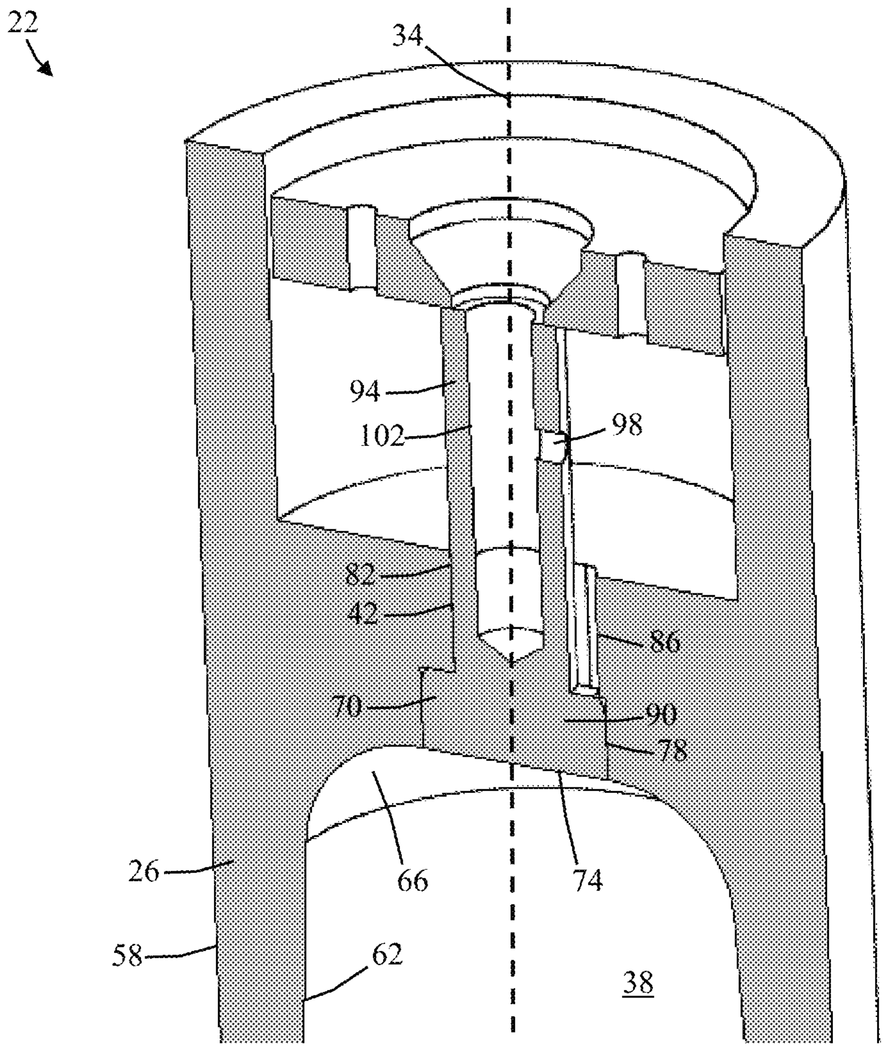
FIG. 3 is a perspective cross-sectional view of a portion of the collection crucible of FIG. 1.

With reference to FIG. 3, the aperture 42 includes a recess portion 78 and a bore portion 82. The aperture 42 further includes a vent portion 86 extending radially from the bore portion 82. In the illustrated embodiment, the ejector 70 includes a head 90 at least partially positioned in the recess portion 78 when the ejector 70 is in the first position. The ejector 70 further includes a shaft 94 positioned in the bore portion 82. The shaft 94 includes a shaft aperture 98 that extends to a shaft vent 102. The venting detailed herein, advantageously prevents a trapped volume being formed when the collection crucible 22 is positioned in a vacuum or low-pressure environment and the ejector 70 is moved. Trapped volumes refer to any volume of gas that has no clear path to the main vacuum body and isn't sealed (e.g., a screw in a blind tapped hole). The gas trapped will slowly leak out over a long period of time, creating a "virtual leak." Trapped volumes are undesired in vacuum systems as the volume will continually leak creating a virtual leak, which increase the difficulty of retaining a desired pressure in a vacuum system and are difficult to detect outside of the vacuum system.

Figure 4:
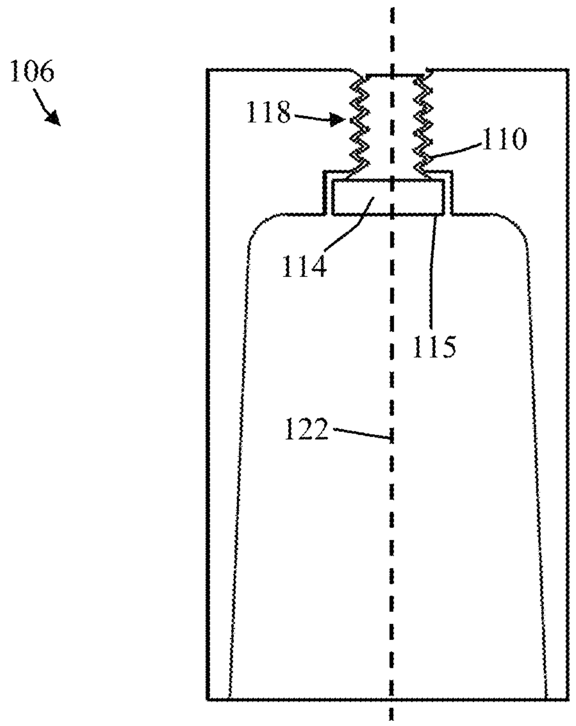
FIG. 4 is a cross-sectional view of a collection crucible with an ejector with a threaded connection, according to one or more embodiments shown and described herein.

With reference to FIG. 4, a collection crucible 106 is illustrated with an aperture 110 and an ejector 114 forming a threaded connection 118. In the illustrated embodiment, the threaded connection 118 is a straight thread. In the illustrated embodiment, the ejector 114 comprises a collection surface 115 and is movable between the first position and the second position in response to rotation of the ejector 114 about a longitudinal axis 122. Advantageously, the threaded connection 118 requires minimum parts, is easy to assemble, improves reliability, and usable with hot cell manipulators.

Figure 5:
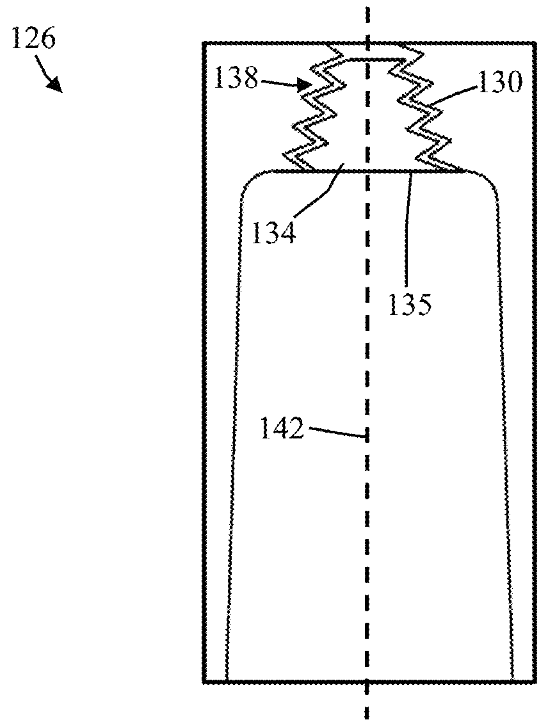
FIG. 5 is a cross-sectional view of a collection crucible with an ejector with a tapered threaded connection, according to one or more embodiments shown and described herein.

With reference to FIG. 5, a collection crucible 126 is illustrated with an aperture 130 and an ejector 134 forming a threaded connection 138. The ejector 134 comprises a collection surface 135. In the illustrated embodiment, the threaded connection 138 is tapered along a longitudinal axis 142. Advantageously, the tapered threaded connection 138 provides a positive stop for the floor of the crucible, and a tighter thread interface to minimize the amount of sublimated material that enters the threads.

Figure 6:
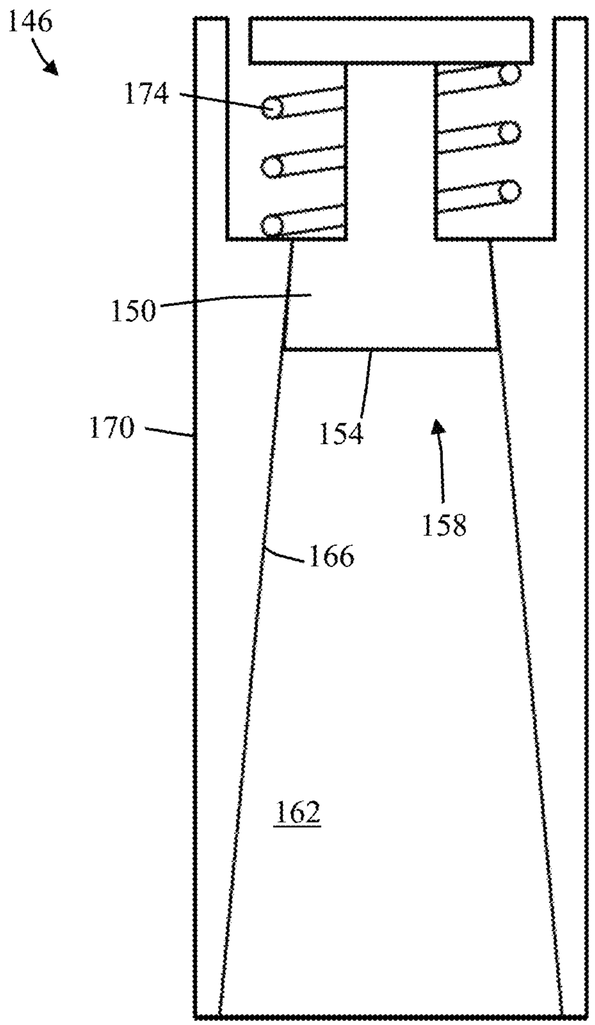
FIG. 6 is a cross-sectional view of a collection crucible with an ejector that is spring-biased and formed an entire floor surface of a crucible cavity, according to one or more embodiments shown and described herein.

With reference to FIG. 6, a collection crucible 146 is illustrated with an ejector 150 having a collection surface 154 that defines an entire floor portion 158 of a cavity 162. In other words, the cavity 162 is formed by a sidewall portion 166 of a body 170 and the collection surface 154 of the ejector 150. Advantageously, the entire floor portion 158 reduces the possibility of leaking or casting flash from occurring and improves the ability to remove the collected material in a single piece. In the illustrated embodiment, the collection crucible 146 further includes a biasing member 174 (e.g., a compression spring) that biases the ejector 150 towards a first position (e.g., a retracted position). In other words, the ejector 150 is spring biased into a non-actuated position and may be selectively move toward an actuated position.

Figure 7:
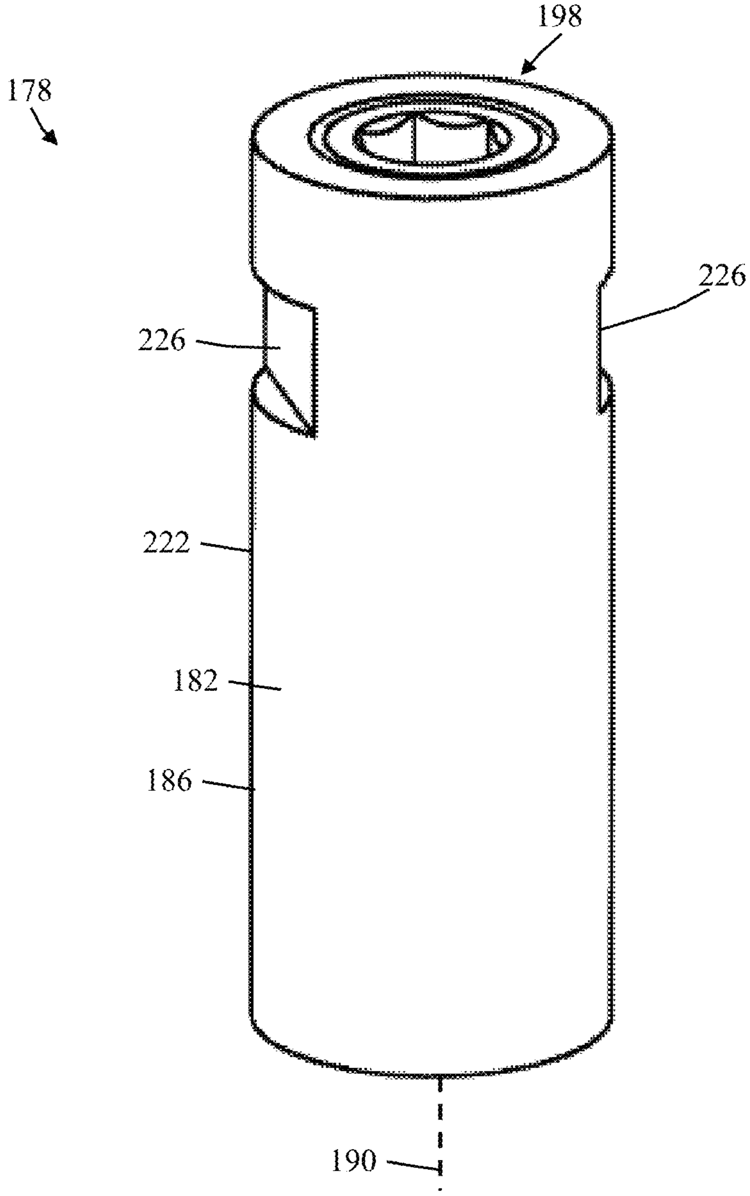
FIG. 7 is a perspective view of a collection crucible, according to one or more embodiments shown and described herein.
Figure 8A:
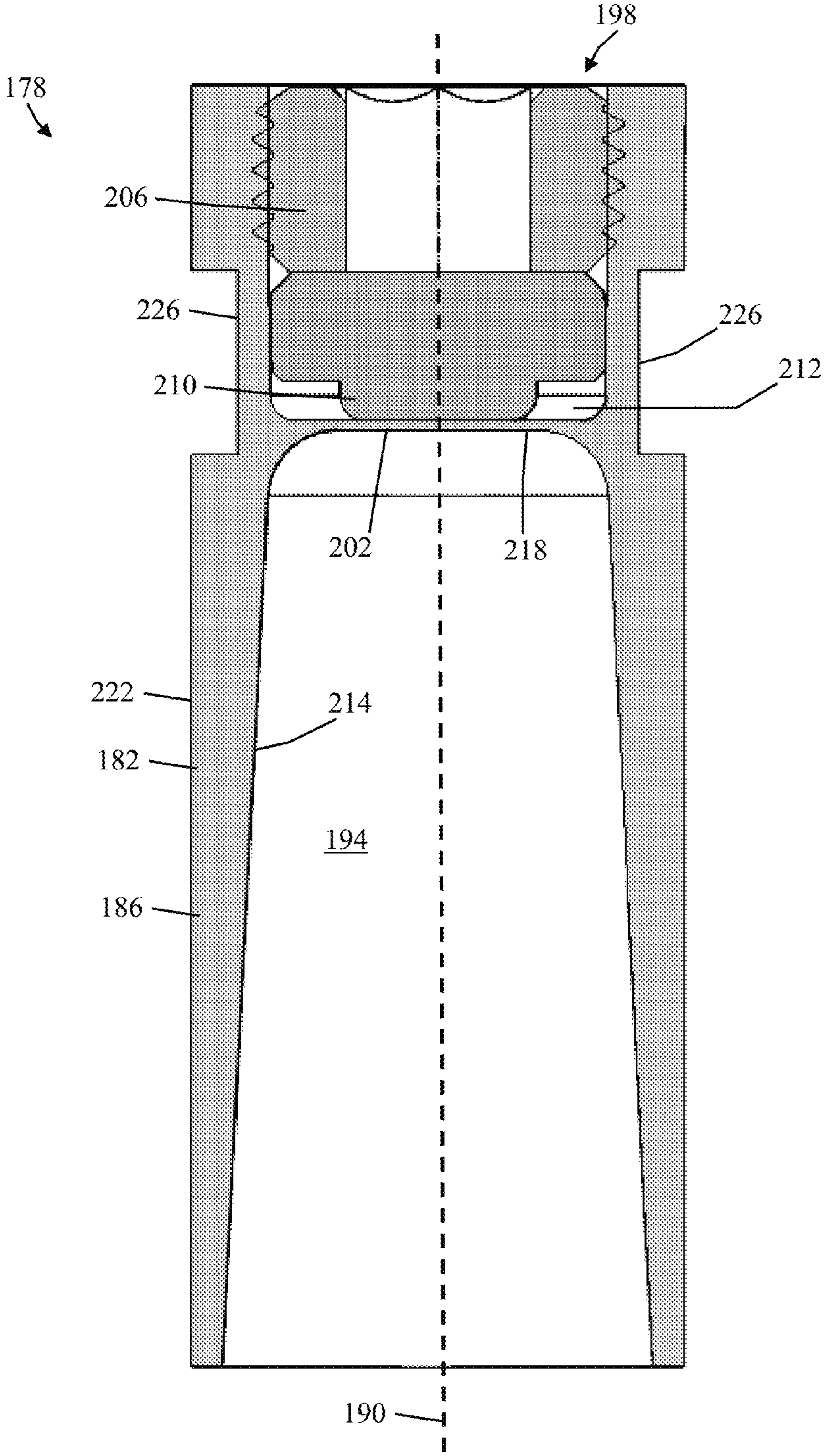
FIG. 8A is a cross-sectional view of the collection crucible of FIG. 7, illustrating an ejector in a retracted position, according to one or more embodiments shown and described herein.
Figure 8B:
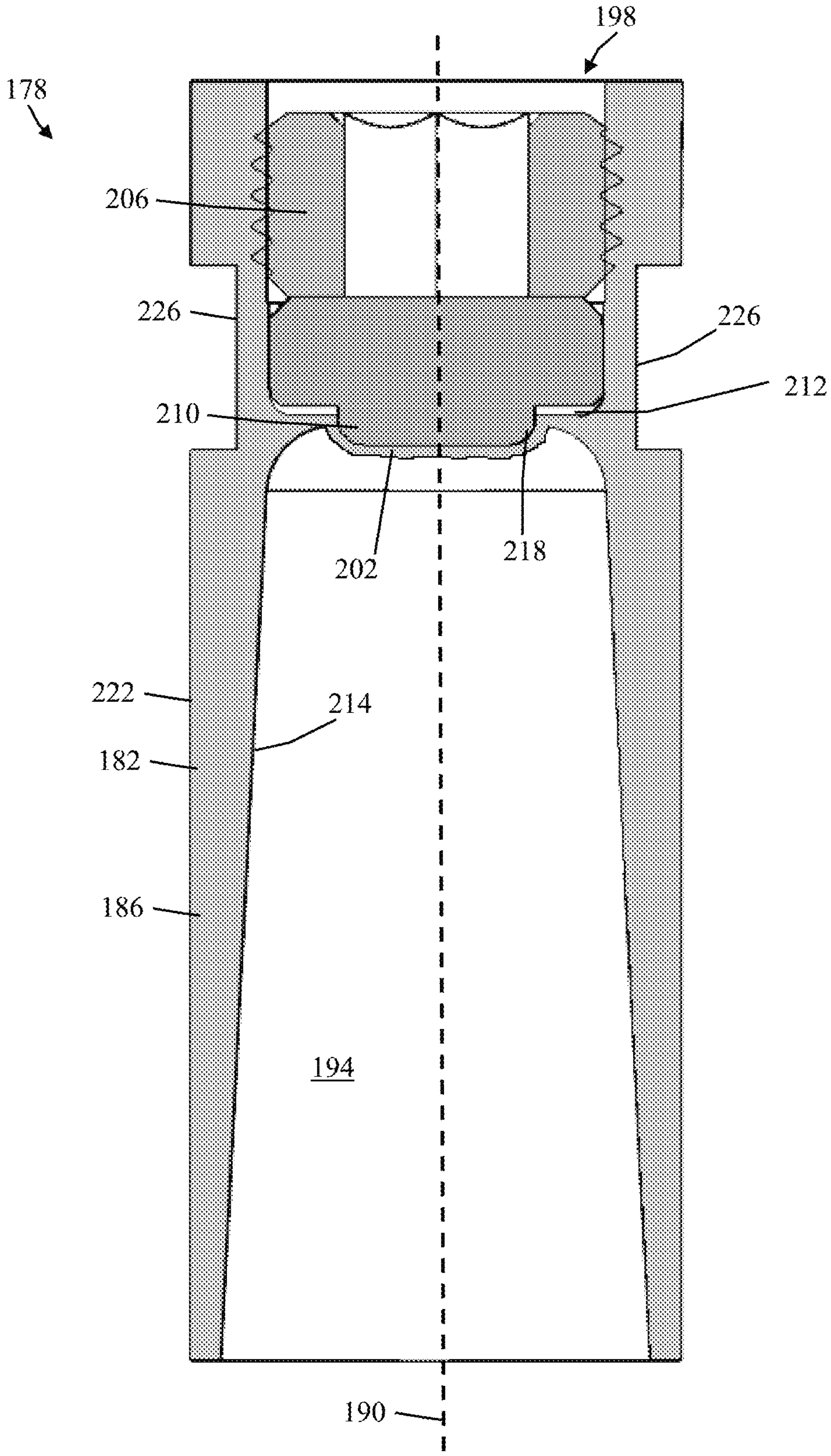
FIG. 8B is a cross-sectional view of the collection crucible of FIG. 7, illustrating an ejector in an extended position that deforms a deformable wall portion of the crucible, according to one or more embodiments shown and described herein.

With reference to FIGS. 7-8B, a collection crucible 178 includes a body 182 having a sidewall portion 186 extending along a longitudinal axis 190. The body 182 at least partially defines a cavity 194 that is tapered along the longitudinal axis 190. The collection crucible 178 further includes an ejector 198 that is movable along the longitudinal axis 190 between a first position (FIG. 8A, a retracted position) and a second position (FIG. 8B, an extended position).

With reference to FIG. 8A, the body 182 includes a deformable wall portion 202 positioned between the cavity 194 and the ejector 198. The ejector 198 includes a screw 206 and a pin 210. In some embodiments, the screw 206 and the pin 210 are integral with each other. The screw 206 and the pin 210 are received within a bore 212 formed in the body 182. In the illustrated embodiment, the pin 210 is positioned between the screw 206 and the deformable wall portion 202. With continued reference to FIG. 8A, the body 182 includes an inner tapered surface 214 and a floor surface 218 that define the cavity 194. In the illustrated embodiment, the ejector 198 does not form any part of the cavity 194.

With reference to FIG. 7, the sidewall portion 186 includes an outer cylindrical surface 222 and at least one outer planar surface 226 that are capable of being securely grasped by a hot cell manipulator. With a secure grasp of the body 182 at the planar surface 226, the operator can apply an actuation force to the ejector 198 with the hot cell manipulator. As such, the collection crucible 178 is designed to overcome the difficulties that arise when handling the collection crucible 178 is limited to hot cell manipulators Advantageously, the ejector 198 is movable using only robotic manipulators that are in a hot cell (e.g., an appropriately radiation-shielded enclosure). It should be understood that the design of the sidewall portion 186, depicted in FIG. 7, may be incorporated into any of the sidewall portions described herein.

With reference to FIG. 8B, the deformable wall portion 202 is deformed in response to the ejector 198 moving from the first position to the second position. In some embodiments, the deformation of the deformable wall portion 202 is entirely elastic deformation. In some embodiments, the deformation of the deformable wall portion 202 is a combination of elastic and plastic deformation. As such, the collection crucible 178 includes a tapered cavity 194 and a deformable wall portion 202 that defines the floor surface 218 of the cavity 194. Deformation of the deformable wall portion 202 pushes the collected material out of the tapered crucible body 182.

Figure 9:
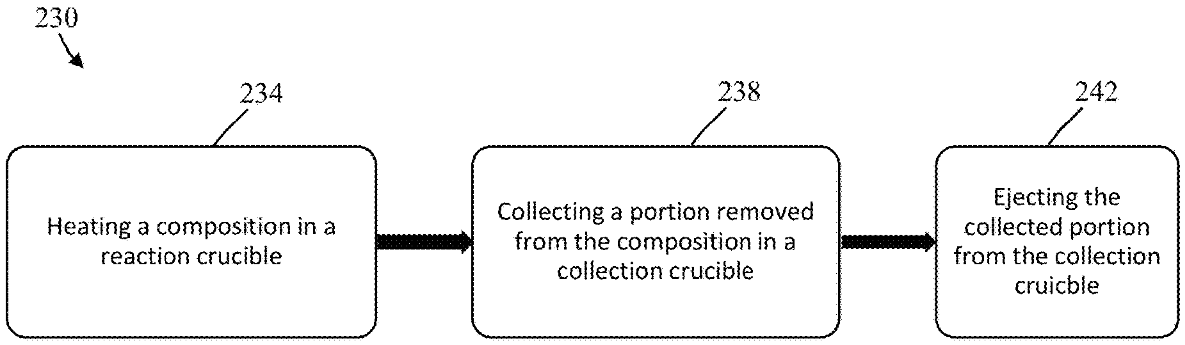
FIG. 9 is a flowchart of a method of collecting and ejecting a portion removed from a heated composition.

With reference to FIG. 9, a method 230 is illustrated including (STEP 234) heating a composition comprising a first element and a second element in a reaction crucible; and (STEP 238) collecting a portion of the second element removed from the composition in a collection crucible (e.g., collection crucible 22, 106, 126, 146, 178). In some embodiments, heating the composition in (STEP 234) phase separates the portion of the second element from the composition in the reaction crucible. In some embodiments, heating the composition in (STEP 234) comprises inductively heating the composition. In some embodiments heating the composition in (STEP 234) comprises retaining a temperature of the composition in a temperature range of from approximately 400° C. to approximately 2000° C. In some embodiment, heating the composition in (STEP 234) includes position the phase change crucible and the collection crucible in an inert or reduced pressure environment.

In some embodiments, collecting the portion of the second element in (STEP 238) is on an inner tapered surface (e.g., inner tapered surface 62, 214) and an adjustable collection region (e.g., the collection surface 74, 115, 135, 154 and/or the deformable wall portion 202) of the collection crucible, which at least partially define the cavity. In some embodiments, the first element is a first rare earth element and the second element is a second rare earth element. In some embodiments, the first rare earth element is lutetium and the second rare earth element is ytterbium. In some embodiments, a separated rare earth element collects on both an inner surface of the tapered crucible body at a collection end and the inner facing surface of the ejector pin.

The method 230 further includes (STEP 242) ejecting the collected portion of the second element from the collection crucible (e.g., by actuation of an ejector to press the adjustable collection region into the cavity). In some embodiments, one or more of the method steps are performed within a hot cell that has limited tools available to manipulate the crucible. In some embodiments, to remove the collected rare earth element from the tapered crucible body, the ejector pin is moved toward an actuated state—that is, pressed into the cavity of the tapered crucible body to push the collected rare earth element out of the tapered collection crucible.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or movable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, optical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A crucible comprising:

a body having a sidewall portion extending along a longitudinal axis, the body at least partially defines a cavity and an aperture extending to the cavity; wherein the cavity is tapered along the longitudinal axis; and an ejector at least partially positioned in the aperture; wherein the ejector is movable along the longitudinal axis between a first position and a second position;

wherein the aperture includes a recess portion and a bore portion, and wherein the ejector includes a head at least partially positioned in the recess portion when the ejector is in the first position, and wherein the ejector includes a shaft positioned in the bore portion; and wherein the aperture further includes a vent portion extending radially from the bore portion and the shaft includes a shaft aperture extending to a shaft vent.

2. The crucible of claim 1, wherein the ejector includes a collection surface that at least partially defines the cavity when the ejector is in the first position and at least partially extends into the cavity when the ejector is in the second position.

3. The crucible of claim 1, wherein the body defines an open end and the cavity has a first diameter at the open end and a second diameter at a position spaced from the open end, the first diameter is larger than the second diameter.

4. The crucible of claim 1, wherein:

the sidewall portion includes an outer surface and an inner tapered surface;

the body further includes a floor surface contiguous with the inner tapered surface;

the inner tapered surface and the floor surface at least partially define the cavity; and the ejector includes a collection surface that at least partially defines the cavity when the ejector is in the first position.

5. The crucible of claim 4, wherein the collection surface is aligned with the floor surface when the ejector is in the first position and the ejector at least partially extends into the cavity when the ejector is in the second position.

6. The crucible of claim 1, wherein the ejector includes a collection surface that defines an entire floor portion of the cavity.

7. The crucible of claim 1, further comprising a biasing member that biases the ejector towards the first position.

8. The crucible of claim 1, wherein the crucible comprises a material that is chemically non-reactive with ytterbium.

9. A crucible comprising:

a body having a sidewall portion extending along a longitudinal axis, the body at least partially defines a cavity that is tapered along the longitudinal axis; and an ejector that is movable along the longitudinal axis between a first position and a second position; and wherein the body includes a deformable wall portion positioned between and separating the cavity and the ejector, wherein the deformable wall portion deforms into the cavity in response to the ejector moving from the first position to the second position.

10. The crucible of claim 9, wherein body includes an inner tapered surface and a floor surface that define the cavity.

11. The crucible of claim 9, wherein the sidewall portion includes an outer cylindrical surface and at least one outer planar surface.

12. The crucible of claim 9, wherein the ejector includes a screw and a pin, wherein the screw and the pin are received within a bore formed in the body with the pin positioned between the screw and the deformable wall portion.

13. A crucible comprising:

a body having a sidewall portion extending along a longitudinal axis, the body at least partially defines a cavity and an aperture extending to the cavity; wherein the cavity is tapered along the longitudinal axis; and an ejector at least partially positioned in the aperture; wherein the ejector is movable along the longitudinal axis between a first position and a second position; and wherein the aperture and the ejector form a threaded connection, and wherein the ejector is moved between the first position and the second position in response to rotation of the ejector about the longitudinal axis.

14. The crucible of claim 13, wherein the threaded connection is tapered along the longitudinal axis.

15. The crucible of claim 13, wherein the ejector includes a collection surface that at least partially defines the cavity when the ejector is in the first position and at least partially extends into the cavity when the ejector is in the second position.

16. The crucible of claim 13, wherein the body defines an open end and the cavity has a first diameter at the open end and a second diameter at a position spaced from the open end, the first diameter is larger than the second diameter.

17. The crucible of claim 13, wherein:

the sidewall portion includes an outer surface and an inner tapered surface;

the body further includes a floor surface contiguous with the inner tapered surface;

the inner tapered surface and the floor surface at least partially define the cavity; and the ejector includes a collection surface that at least partially defines the cavity when the ejector is in the first position.

18. The crucible of claim 17, wherein the collection surface is aligned with the floor surface when the ejector is in the first position and the ejector at least partially extends into the cavity when the ejector is in the second position.

19. The crucible of claim 13, wherein the ejector includes a collection surface that defines an entire floor portion of the cavity.

20. The crucible of claim 13, wherein the crucible comprises a material that is chemically non-reactive with ytterbium.

* * * * *